United States Patent
Jang

(10) Patent No.: US 8,750,608 B2
(45) Date of Patent: Jun. 10, 2014

(54) IMAGE PROCESSING METHOD AND APPARATUS

(75) Inventor: Soon-geun Jang, Seongnam-si (KR)

(73) Assignees: Samsung Electronics Co., Ltd., Suwon-si (KR); Industry-University Cooperation Foundation Sogang University, Seoul (KR)

( * ) Notice: Subject to any disclaimer, the term of this patent is extended or adjusted under 35 U.S.C. 154(b) by 421 days.

(21) Appl. No.: 13/267,245

(22) Filed: Oct. 6, 2011

(65) Prior Publication Data

US 2012/0257824 A1    Oct. 11, 2012

(30) Foreign Application Priority Data

Apr. 8, 2011    (KR) .................. 10-2011-0032727

(51) Int. Cl.
*G06K 9/36*    (2006.01)
(52) U.S. Cl.
USPC ........................................... 382/166
(58) Field of Classification Search
CPC ...... G06T 9/005; H04N 1/64; H04N 7/26292; H04N 7/26148; H04N 7/26244
See application file for complete search history.

(56) References Cited

U.S. PATENT DOCUMENTS

| | | | |
|---|---|---|---|
| 8,472,748 B2* | 6/2013 | Jang et al. | 382/266 |
| 8,483,479 B2* | 7/2013 | Kunkel et al. | 382/165 |
| 2005/0117799 A1* | 6/2005 | Fuh et al. | 382/169 |
| 2009/0041376 A1* | 2/2009 | Carletta et al. | 382/274 |
| 2010/0195908 A1* | 8/2010 | Bechtel et al. | 382/167 |
| 2011/0305391 A1* | 12/2011 | Kunkel et al. | 382/167 |
| 2012/0262600 A1* | 10/2012 | Velarde et al. | 348/223.1 |

* cited by examiner

*Primary Examiner* — Vikkram Bali
(74) *Attorney, Agent, or Firm* — Drinker Biddle & Reath LLP

(57) ABSTRACT

An image processing method and apparatus employ wide dynamic range imaging. The image processing method includes: providing a radiance map; decomposing a luminance value of the radiance map into a base layer and a detail layer; generating a weight using a ratio between the luminance value of the radiance map and the base layer; creating a compressed luminance using the base layer, the detail layer, and the weight; and generating a tone-mapped image using a color value of the radiance map, the luminance value of the radiance map, and the compressed luminance value. The image processing method provides a display image with enhanced local contrast and details.

22 Claims, 6 Drawing Sheets

FIG. 3A
FIG. 3B
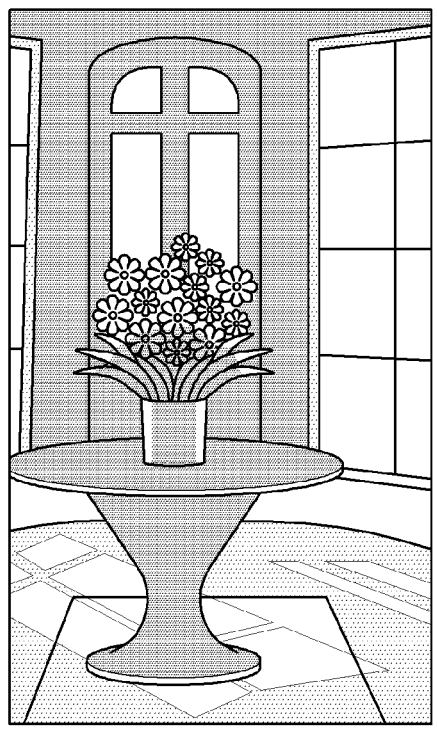
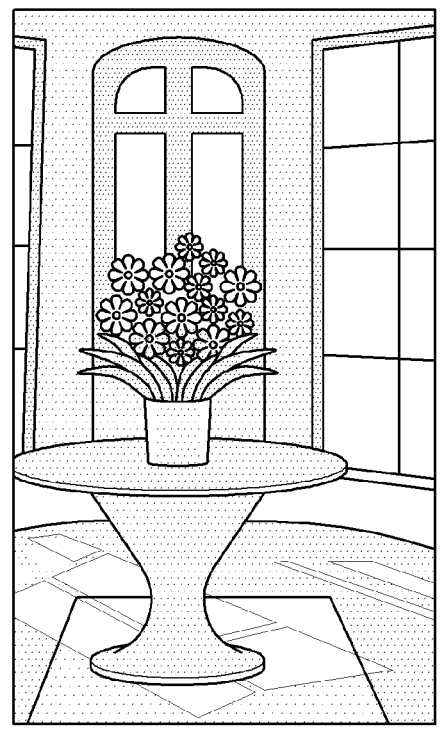

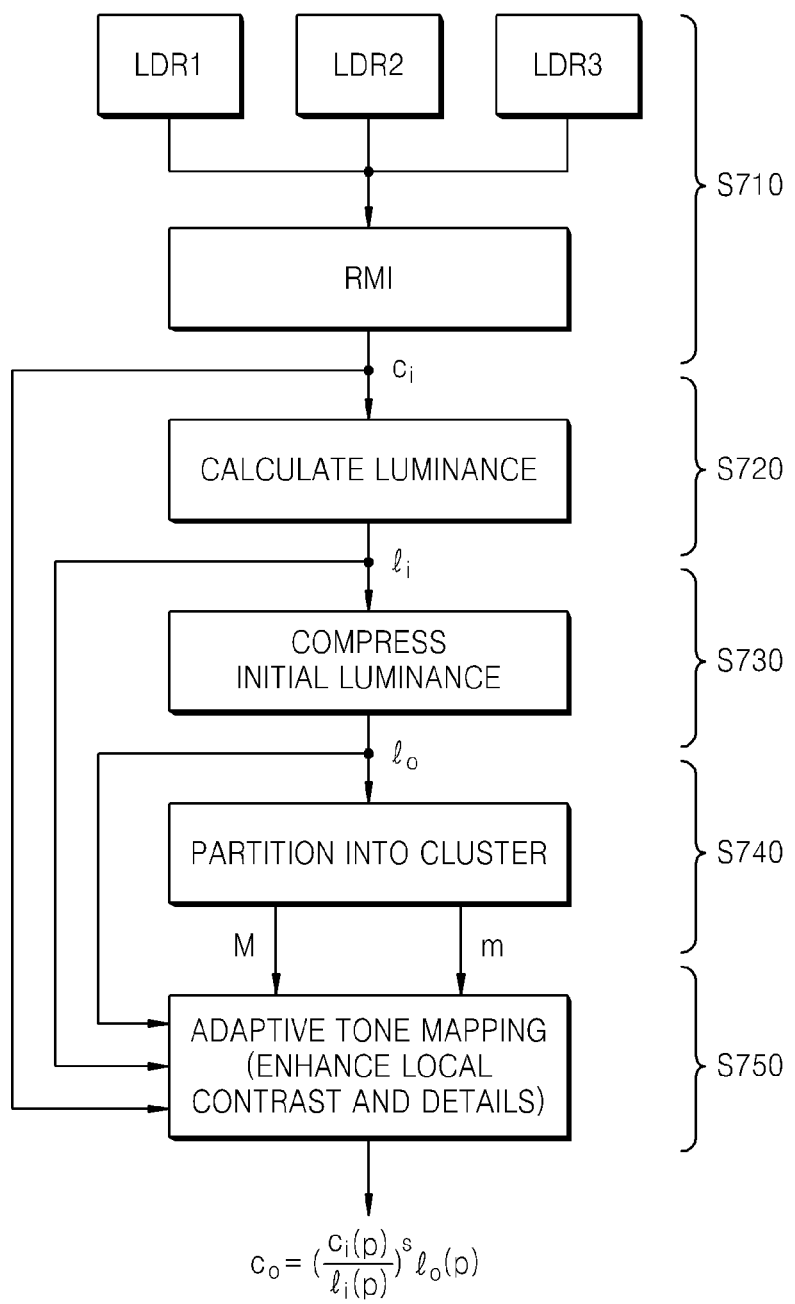

IMAGE PROCESSING METHOD AND APPARATUS

CROSS-REFERENCE TO RELATED PATENT APPLICATION

This application claims the priority benefit of Korean Patent Application No. 10-2011-0032727, filed on Apr. 8, 2011, in the Korean Intellectual Property Office, the disclosure of which is incorporated herein in its entirety by reference.

BACKGROUND

1. Field

Embodiments relate to an image processing method and apparatus employing wide dynamic range imaging.

2. Description of the Related Art

Wide dynamic range imaging refers to a technique of more accurately representing the range of luminance that human vision can accommodate when viewing a real nature scene into a digital image.

Wide dynamic range imaging can be used in a wide variety of applications such as medical imaging, satellite imaging, physical substrate rendering, and digital cinema. The range of luminance a human eye can perceive is $10^8:1$ while the range of luminance a digital device can represent is limited to 100:1. Thus, in order to display data with a wide dynamic range on a digital display device, an appropriate conversion technique is needed. This conversion is called tone mapping.

Examples of conventional tone mapping methods include a Reinhard method, Fast Tone Mapping, and Tone Mapping using iCAM06 image color appearance model.

However, conventional tone mapping methods suffer from loss of local contrast and details in dark regions and insufficient contrast enhancement. Another drawback is that color artifacts or false contours may appear in regions of a tone-mapped image.

SUMMARY

Embodiments include an image processing method and apparatus capable of acquiring a display image with enhanced local contrasts and details.

Embodiments also include an image processing method and apparatus capable of acquiring a display image with reduced color artifacts or false contours.

According to an embodiment, an image processing method includes: providing a radiance map; decomposing a luminance value of the radiance map into a base layer and a detail layer; generating a weight using a ratio between the luminance value of the radiance map and the base layer; creating a compressed luminance using the base layer, the detail layer, and the weight; and generating a tone-mapped image using a color value of the radiance map, the luminance value of the radiance map, and the compressed luminance value.

In this case, the radiance map may be derived from a plurality of low dynamic range images with different exposure levels. In the providing of the radiance map, the radiance map may be a color value. The method may further include transforming the color value into the luminance value after the providing of the radiance map. In the generating of the weight, a color saturation parameter that controls the saturation in obtaining the tone-mapped image may be generated using the base layer.

According to another embodiment, an image processing apparatus includes: a radiance map provider that provides a radiance map; a decomposer that decomposes a luminance value of the radiance map into a base layer and a detail layer; a weight generator that generates a weight using a ratio between the luminance value of the radiance map and the base layer; a compression portion that creates a compressed luminance using the base layer, the detail layer, and the weight; and a tone mapping portion that generates a tone-mapped image using a color value of the radiance map, the luminance value of the radiance map, and the compressed luminance value.

In this case, the radiance map provider may derive the radiance map from a plurality of low dynamic range images with different exposure levels. The radiance map provided by the radiance map provider may be a color value. The apparatus may further include a transformation unit that transforms the color value into the luminance value. The weight generator may generate a color saturation parameter that controls the saturation for the tone-mapped image using the base layer.

In another embodiment, the image processing method includes: providing a radiance map; compressing a luminance value of the radiance map; segmenting an image into a plurality of regions according to the compressed luminance value; and generating a tone-mapped image using a color value of the radiance map, the compressed luminance value, and information about the regions.

In this case, the radiance map may be derived from a plurality of low dynamic range images with different exposure levels. In the providing of the radiance map, the radiance map may be a color value. The method may further include transforming the color value of the radiance map into the luminance value after the providing of the radiance map.

The compressing of a luminance value of the radiance map may include filtering the luminance value of the radiance map and compressing the resulting luminance value using a logarithmic function. In the segmenting of an image into a plurality of regions, the image may be segmented using a K-means algorithm. After the segmenting of the image, information about the locations of the regions and mean brightness information may be generated. In the generating of a tone-mapped image, a color saturation parameter that controls the saturation for the tone-mapped image may be generated using the mean brightness information.

In another embodiment, the image processing apparatus includes: a radiance map provider that provides a radiance map; a compression portion that compresses a luminance value of the radiance map; a region divider that segments an image into a plurality of regions according to the compressed luminance value; and a tone mapping portion that generates a tone-mapped image using a color value of the radiance map, the compressed luminance value, and information about the regions.

In this case, the radiance map provider may derive the radiance map from a plurality of low dynamic range images with different exposure levels.

The radiance map provided by the radiance map provider may be a color value. The apparatus may further include a transformation unit that transforms the color value of the radiance map into the luminance value. The compression portion may filter the luminance value of the radiance map and compress the resulting luminance value using a logarithmic function. The region divider may segment the image into the plurality of regions using a K-means algorithm. Information about the locations of the regions and mean brightness information may be generated after the segmenting of the image. The tone mapping portion may generate a color saturation parameter that controls the saturation in obtaining the tone-mapped image using the mean brightness information.

As described above, the image processing method and apparatus use adaptive tone mapping to obtain a display image with enhanced local contrasts and details and reduced color artifacts and false contours.

BRIEF DESCRIPTION OF THE DRAWINGS

The above and other features and advantages will become more apparent by describing in detail exemplary embodiments with reference to the attached drawings in which:

FIGS. 3A and 3B illustrate images acquired using conventional tone mapping and tone mapping according to an embodiment, respectively;

FIG. 7 is a flowchart of an image processing method, according to another embodiment.

DETAILED DESCRIPTION

Figure 1:
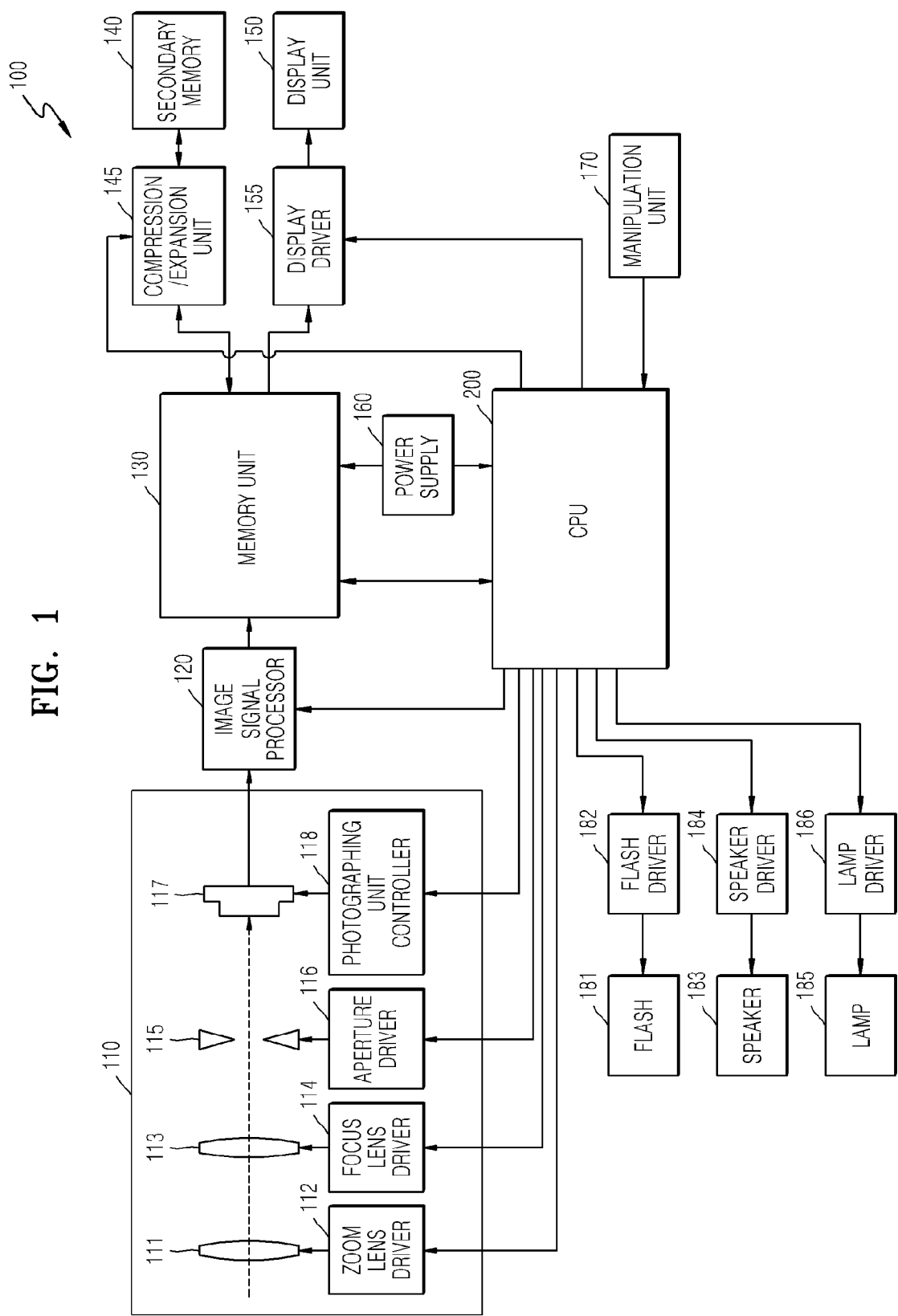
FIG. 1 is a block diagram of an image processing apparatus, according to an embodiment.

Since various changes may be made and various kinds of embodiments may be implemented, specific embodiments will be illustrated in the drawings and intended to be described in detail in the detailed description. However, the specific embodiments described should not be considered limiting, but to include all changes, equivalents, and substitutions which fall in the spirit and technological scope of the invention as defined by the following claims. Well-known related technologies may not be described in detail so as not to be obscuring.

Terms including an ordinal number such as the first and the second may be used in describing various components; however, such components are not limited to the terms. The terms are only used for the purpose of distinguishing one component from another one.

It is also to be understood that the terminology used herein is for the purpose of describing particular embodiments only, and is not intended to be limiting. Use of the singular forms "a," "an," and "the" include plural references as well unless expressly specified otherwise. The terms "comprising", "including", and "having" specify the presence of stated features, numbers, steps, operations, elements, components, and/or a combination thereof but do not preclude the presence or addition of one or more other features, numbers, steps, operations, elements, components, and/or a combination thereof. Exemplary embodiments will now be described more fully with reference to the accompanying drawings. An identical or corresponding component is assigned the same reference numeral and a detailed description thereof will be omitted.

FIG. 1 is a block diagram of an image processing apparatus, according to an embodiment. In the present embodiment, a digital camera 100 is used as an example of the image processing apparatus. However, the image processing apparatus according to the present embodiment is not limited thereto and may be a digital single-lens reflex camera, a hybrid camera, or various other display devices. The construction of the digital camera 100 will now be described in detail according to the operation of components therein.

First, a process of photographing a subject is described. Luminous flux originating from the subject is transmitted through a zoom lens 111 and a focus lens 113 that are an optical system of a photographing device 110, and the intensity of the luminous flux is adjusted by the opening/closing of an aperture 115 before an image of the subject is focused on a light-receiving surface of a photographing unit 117. The focused image is then photoelectrically converted into an electric image signal.

The photographing unit 117 may be a Charge Coupled Device or Complementary Metal Oxide Semiconductor Image Sensor (CIS) that converts an optical signal into an electrical signal. The aperture 115 is wide open in a normal mode or while an autofocusing algorithm is being executed upon reception of a first release signal produced by pressing a release button halfway. Furthermore, an exposure process may be performed upon reception of a second release signal produced by gently pressing the release button.

A zoom lens driver 112 and a focus lens driver 114 control the positions of the zoom lens 111 and the focus lens 113, respectively. For example, upon generation of a wide angle-zoom signal, the focal length of the zoom lens 111 decreases so the angle of view gets wider. Upon generation of a telephoto-zoom signal, the focal length of the zoom lens 111 increases so the angle of view gets narrower. Since the position of the focus lens 113 is adjusted with the zoom lens 111 set at a specific position, the angle of view is little affected by the position of the focus lens 113. An aperture driver 116 controls the extent to which the aperture 115 opens. A photographing unit controller 118 regulates the sensitivity of the photographing unit 117.

The zoom lens driver 112, the focus lens driver 114, the aperture driver 116, and the photographing unit controller 118 respectively control the zoom lens 111, the focus lens 113, the aperture 115, and the photographing unit 117 according to the result of operations executed by a CPU 200 based on exposure information and focus information.

A process of producing an image signal is described. The image signal output from the photographing unit 117 is fed into an image signal processor 120. If an image signal input from the photographing unit 117 is an analog signal, the image signal processor 120 converts the analog signal into a digital signal and performs image processing on the digital signal. The resulting image signal is temporarily stored in a memory unit 130.

More specifically, the image signal processor 120 performs signal processing such as auto white balance, auto exposure, and gamma correction to improve image quality by converting input image data to a form suitable for human vision and outputs a resulting image signal with improved quality. The image signal processor 120 also performs image processing such as color filter array interpolation, color matrix, color correction, and color enhancement.

In particular, the image signal processor 120 decomposes a luminance value of a radiance map into a base layer and a detail layer, generates a weight using a ratio of the luminance value of the radiance map to the luminance value of the base layer, creates a compressed luminance value using the base layer, the detail layer and the weight, and produces a final tone-mapped image using color values of the radiance map, the luminance value of the radiance map, and the compressed luminance value. The operation of the image signal processor 120 will be described in more detail later with reference to FIGS. 2 through 5.

The memory unit 130 includes a program memory in which programs related to operations of the digital camera 100 are stored regardless of the presence of a power supply and a main memory in which the image data and other data are temporarily stored while power is being supplied.

More specifically, the program memory stores an operating system for operating the digital camera 100 and various application programs. The CPU 200 controls each component according to the programs stored in the program memory. The main memory temporarily stores an image signal output from the image signal processor 120 or a secondary memory 140.

Apart from supplying power to operate the digital camera 100, a power supply 160 may be connected directly to the main memory. Thus, codes stored in the program memory may be copied into the main memory or converted into executable codes prior to booting so as to facilitate booting of the digital camera 100. Furthermore, in the event of a reboot, requested data can be retrieved quickly from the main memory.

An image signal stored in the main memory is output to a display driver 155 and is converted into an analog image signal having a form optimal for display. The resulting image signal is displayed on a display unit 150 so that a user can view it as a predetermined image. The display unit 150 may also serve as a view-finder that consecutively displays image signals obtained by the photographing unit 117 in a photographing mode and determines an area of the subject to be photographed. The display unit 150 may be a liquid crystal display (LCD), an organic light-emitting diode (OLED), an electrophoresis display (EDD), or various other displays.

A process of recording the generated image signal is described. The image signal is temporarily stored in the memory unit 130. The image signal is also stored in the secondary memory 140, together with various information about the image signal. The image signal and the information are output to a compression/expansion unit 145.

The compression/expansion unit 145 performs compression, i.e., encoding such as Joint Photographic Experts Group (JPEG) encoding into a form optimal for storage using a compression circuit, and generates an image file that is stored in the secondary memory 140.

The secondary memory 140 may be a stationary semiconductor memory such as an external flash memory, a card type or stick type detachable semiconductor memory such as a flash memory card, a magnetic memory medium such as a hard disk or floppy disk, or various other types of memories.

A process of reproducing an image is described. The image file recorded on the secondary memory 140 is output to the compression/expansion unit 145. The compression/expansion unit 145 then performs expansion, i.e., decoding on the image file using an expansion circuit, extracts an image signal from the image file, and outputs the image signal to the memory unit 130. After temporarily storing the image signal in the memory unit 130, a predetermined image is reproduced on the display unit 150 by the display driver 155.

The digital camera 100 further includes a manipulation unit 170 that receives signals from a user or an external input device. The manipulation unit 170 may include a shutter release button that causes a shutter to open or close exposing the photographing unit 117 to incoming light for a predetermined time, a power button for entering information in order to supply power, a wide angle-zoom button and a telephoto-zoom button for respectively widening and narrowing angle of view according to an input, and various function buttons for selecting a text input mode, a photo taking mode, and a reproduction mode and for selecting a white balance setting function and an exposure setting function.

The digital camera 100 further includes a flash 181 and a flash driver 182 driving the flash 181. The flash 181 is used to instantly illuminate a subject with bright light when taking photos in a dark place.

A speaker 183 and a lamp 185 respectively output an audio signal and a light signal to inform the operation status of the digital camera 100. In particular, when photographing conditions initially set by the user in a manual mode change at the time when photography takes place, a warning tone or optical signal may be output through the speaker 183 or the lamp 185 to indicate such a change. A speaker driver 184 controls the speaker 183 to adjust the type and volume of audio output. A lamp driver 186 controls the lamp 185 to adjust the presence of light emission, light emission time period, and the type of light emission.

The CPU 200 performs operations according to the operating system and application programs stored in the memory unit 130 and controls the components according to the result of the operations so that the digital camera 100 can operate as described above.

The operation of the image signal processor 120 according to an embodiment will now be described in detail with reference to FIGS. 2, 3A, and 3B.

In general tone mapping, the contrast of a luminance obtained from a radiance map with a wide dynamic range is compressed and then red (R), green (G), and blue (B) values of a final tone-mapped image are calculated using a ratio of each of the R, G, and B color values to the luminance of the radiance map. A color value of an image obtained by the general tone mapping is defined by Equation (1) below:

$$c_o = \left(\frac{c_i}{l_i}\right)^s l_o \qquad (1)$$

where $c_o$, $l_i$, and $c_i$ respectively denote a color value of a tone-mapped image, an input luminance value, and an input color value, respectively, and s and $l_o$ respectively denote a color saturation parameter that controls the saturation in obtaining a final tone-mapped color image and a compressed luminance value.

In this case, the color saturation parameter s may be used simultaneously as a typical nonlinear color saturation parameter, as a color saturation parameter having a value of 1 to preserve a color ratio, and as a linear color saturation parameter used to reduce the amount of computations.

The tone mapping process performed using Equation (1) results in loss of or insufficient enhancement of local contrasts and details in dark areas. In a wide dynamic range image created from low dynamic range (LDR) images with different exposure times, most pixels have a range of low luminance values. Thus, during tone mapping, a luminance value of a wide dynamic range image needs to be compressed. Since local contrasts and details are insufficient in a dark or highlight region when a simple local compression method is used, the luminance value has to be compressed for each region or for each component of an image.

A tone mapping process according to an embodiment includes decomposing a luminance value of a radiance map into a base layer and a detail layer to obtain a compressed luminance value with enhanced local contrasts and details and obtaining R, G, and B color values of a final tone-mapped image with enhanced local contrasts and details using the compressed luminance value. A color value of an image obtained by tone mapping according to an embodiment is defined by Equation (2) below:

$$c_o = \left(\frac{c_i}{l_i}\right)^s \{w \cdot f(l_i^{base}) + f(l_i^{detail})\} \quad (2)$$

where $c_o$, $l_i$, and $c_i$ respectively represent a color value of a tone-mapped image, an input luminance value, and an input color value, s and $\{w \cdot f(l_i^{base}) + f(l_i^{det\ ail})\}$ respectively denote a color saturation parameter that controls the saturation in obtaining a final tone-mapped color image and a compressed luminance value obtained by decomposition into a base layer and a detail layer, and w denotes an adaptive weight.

The construction of the image signal processor 120 according to the present embodiment that performs tone mapping is described with reference to FIG. 2.

Figure 2:
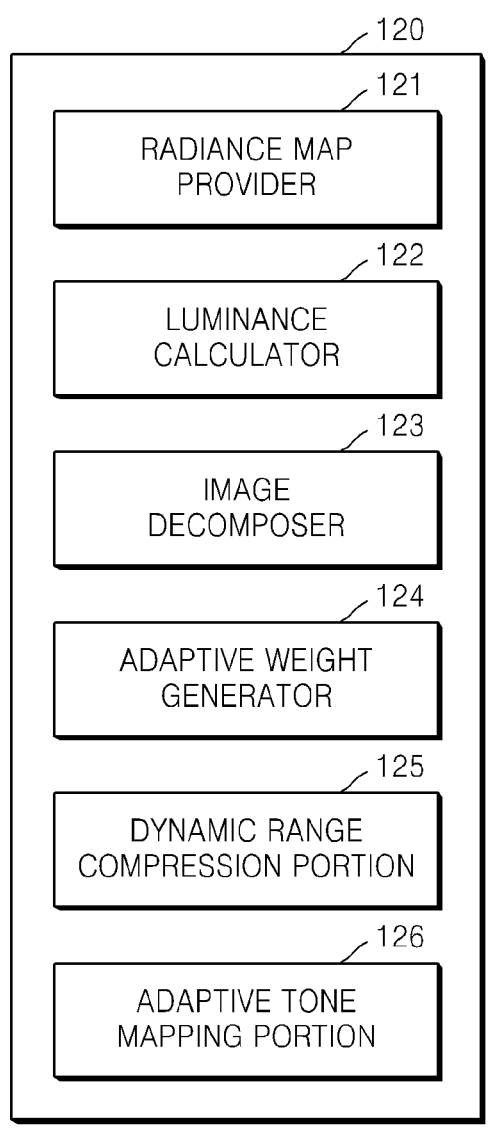
FIG. 2 is a block diagram of the image signal processor in the image processing apparatus of FIG. 1, according to an embodiment.

FIG. 2 is a block diagram of the image signal processor 120 in the image processing apparatus of FIG. 1, according to an embodiment. Referring to FIG. 2, the image signal processor 120 includes a radiance map provider 121, a luminance calculator 122, an image decomposer 123, an adaptive weight generator 124, a dynamic range compression portion 125, and an adaptive tone mapping portion 126.

The radiance map provider 121 provides a radiance map. The radiance map refers to a single image obtained from one or more LDR images taken with different exposure times using an auto exposure bracketing (AEB) mode of the digital camera 100. The radiance map may be generated from LDR images using a method proposed by Debevec and Malik. Since the method of Debevec and Malik is known in the art, a detailed description thereof is not given. The radiance map is an image having a range of luminance values that cannot be displayed on the display unit 150. That is, the radiance map has a wide dynamic range. Thus, the radiance map should be converted into a display image that can be displayed on the display unit 150. The luminance calculator 122 calculates a luminance value from R, G, and B values of the radiance map provided by the radiance map provider 121.

The image decomposer 123 then divides the luminance value into the luminance value of a base layer $l_i^{base}$ and the luminance value of a detail layer $l_i^{det\ ail}$. The base layer and the detail layer may be low- and high-frequency components of an image, respectively. The base layer with a wide dynamic range is used to obtain a compressed luminance value using an existing luminance compression function, while the detail layer is used to enhance details in regions. The entire image may be decomposed by a bilateral filter (not shown). An output image may be used as a base layer, while a difference between the original image and the base layer may be used as a detail layer. Gaussian filtering that is simpler than using a bilateral filter, wavelet method and Gabor filtering that are more complicated than using a bilateral filter, and other various decomposition methods may be used for the image decomposition.

The adaptive weight generator 124 generates an adaptive weight w using the ratio between the luminance value $l_i$ obtained by the luminance calculator 122 and the base layer $l_i^{base}$ obtained by the image decomposer 123. The adaptive weight w is defined by Equation (3)

$$w = a * \left(\frac{l_i}{l_i^{base}}\right)^{p(l_i^{base})}, (0 \le a \le 1) \quad (3)$$

$$a = \frac{1}{\min\{p(l_i^b), 2\}}$$

where w and a respectively denote an adaptive weight and a proportionality constant and $l_i^{base}$, and $l_i$, and $p(l_i^{base})$ respectively denote a luminance value of the base layer, an input luminance value, and a local contrast control parameter. The proportionality constant a limits its denominator to a value that is less than or equal to 2 even if the local contrast control parameter is greater than 2.

The luminance value $l_i^{base}$ of the base layer obtained by the image decomposer 123 is compressed using a luminance compression function. In this case, when the same luminance compression function is employed for all pixels, local contrasts will be degraded. Thus, the adaptive weight w is used to compress a luminance value to preserve the local contrasts.

The dynamic range compression portion 125 uses the luminance values $l_i^{base}$ and $l_i^{det\ ail}$ of the base layer and the detail layer obtained by the image decomposer 123 and the adaptive weight w obtained by the adaptive weight generator 124 to generate a luminance with enhanced local contrast and details. The luminance is defined by Equation (4) below:

$$l_o = \{w \cdot f(l_i^{base}) + f(l_i^{det\ ail})\} \quad (4)$$

where w denotes an adaptive weight containing a local contrast control parameter and $f(l_i^{base})$ and $f(l_i^{det\ ail})$ denote luminance compression functions for the base layer and the detail layer, respectively. Thus, the adaptive weight w may be used to enhance a local contrast of a final image. By compressing the luminance value of the detail layer, a final image with enhanced details may be obtained.

The adaptive tone mapping portion 126 receives the R, G, and B values $c_i$ of the radiance map, the luminance value $l_i$, and the compressed luminance value $\{w \cdot f(l_i^{base}) + f(l_i^{det\ ail})\}$ from the radiance map provider 121, the luminance calculator 122, and the dynamic range compression portion 125, respectively, and obtains R, G, and B values $c_o$ of a final tone-mapped image. Operations performed for adaptive tone mapping are given by Equation (2) above.

FIG. 3A illustrates a tone mapped image acquired using a conventional iCAM06 image color appearance model, while FIG. 3B illustrates an image obtained by tone mapping according to an embodiment. Upon comparison between the two tone mapped images, the tone mapped image shown in FIG. 3B has a better color and as well as enhanced local contrast and details than the tone mapped image shown in FIG. 3A.

The image signal processor 120 according to another embodiment will now be described with reference to FIGS. 4 and 5.

When tone mapping is performed as expressed by Equation (1), color artifacts or false contours may appear in each region. First, color artifacts or false contours may occur in a highlight smooth region and a dark smooth region. Second, color artifacts may be present in a boundary region of a tone mapped image due to problems associated with processing of the boundary region of the image. When there is a motion between LDR images, alignment is needed between the LDR images before creating a wide dynamic range image. That is, motion between the LDR images is compensated. After the motion compensation, radiance information is lost in a boundary region of the image. Like in the highlight smooth region and the dark smooth region, tone mapping of a wide dynamic range image may cause color artifacts at the boundary region where radiance information is lost.

Thus, the contrast of a luminance value obtained from a radiance map with a wide dynamic range is compressed and R, G, and B values of a final tone-mapped image is calculated using the ratio between each of the R, G, and B color values and the luminance of the radiance map. In this case, the color ratio is corrected using a color saturation parameter and then multiplied by the luminance value of the radiance map having the compressed contrast so as to obtain the R, G, and B color values of the final tone-mapped image.

When the R, G, and B color values are calculated by using the same color saturation parameter for all regions, color artifacts or false contours may occur. According to the present embodiment, the R, G, and B color values of the final tone-mapped image are calculated using color saturation parameters that are obtained suitably according to the brightness of each region. The R, G, and B color values obtained by tone mapping according to the present embodiment are defined by Equation (5) below:

$$c_o(p) = \left(\frac{c_i(p)}{l_i(p)}\right)^s l_o(p) \qquad (5)$$

where $c_o(p)$ and $l_i(p)$, and $c_i(p)$ respectively represent a color value of a tone mapped image, an input luminance value, an input color value provided by the radiance map provider 121, and s and $l_o(p)$ respectively represent a color saturation parameter that controls the saturation in obtaining a final tone-mapped color image and an initial compressed luminance value.

Then, the construction of the image signal processor 120 performing tone mapping according to the present embodiment is described in detail with reference to FIG. 4.

Figure 4:
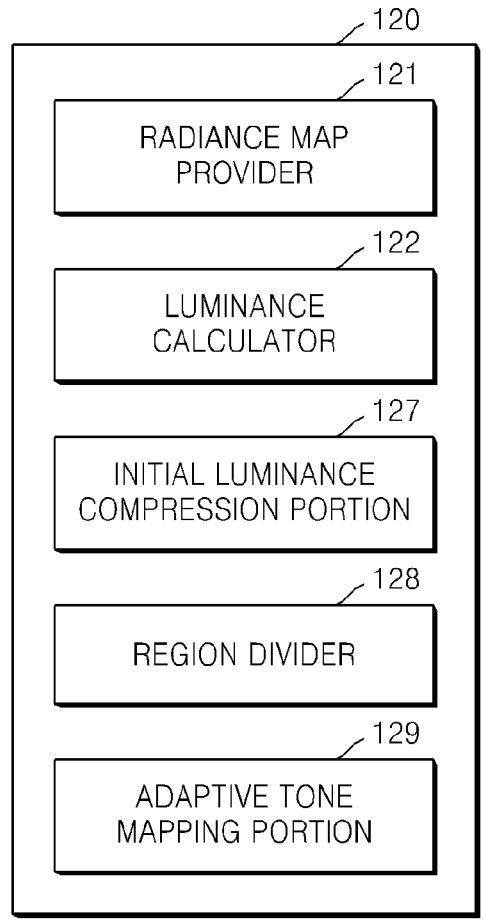
FIG. 4 is a block diagram of the image signal processor in the image processing apparatus of FIG. 1, according to another embodiment.

FIG. 4 is a block diagram of the image signal processor 120 in the image processing apparatus of FIG. 1, according to another embodiment. Referring to FIG. 4, the image signal processor 120 according to the present embodiment includes a radiance map provider 121, a luminance calculator 122, a default luminance compression portion 127, a region divider 128, and an adaptive tone mapping portion 129.

The radiance map provider 121 provides a radiance map. Since the operation of the radiance map provider 121 have been described above, a detailed description thereof is not given. The luminance calculator 122 calculates a luminance value $l_i(p)$ from R, G, and B values of the radiance map provided by the radiance map provider 121.

The initial luminance compression portion 127 compresses the luminance value $l_i(p)$ using a luminance compression function. A logarithmic function or other various functions may be used as the luminance compression function. The luminance value $l_i(p)$ calculated before the compression is filtered using a bilateral filter. For edge preserving smoothing, the bilateral filter considers geometric closeness between adjacent pixels in the spatial domain as well as similarity of intensity in the intensity domain.

A luminance value obtained by compressing the output luminance of the bilateral filter is given by Equation (6) below:

$$l_o(p) = \log(\tilde{l}/(q)) \qquad (6)$$

where $\tilde{l}(q)$ denotes output luminance of the bilateral filter.

The region divider 128 uses a K-means algorithm to segment an image into K cluster regions according to the initial compressed luminance value $l_o(p)$. The K-means algorithm assigns each pixel to the cluster whose centroid is the mean of all pixels in the cluster. If the mean brightness of k-th cluster is $m_k$, the mean brightness vector m for K clusters may be defined by Equation (7) below:

$$m = [m_1, \ldots, m_k, \ldots, m_K]^T \qquad (7)$$

The segmented region is expressed by Equation (8):

$$M(p) = k, \ 1 \leq k \leq K \qquad (8)$$

The adaptive tone mapping portion 129 uses the input color value $c_i(p)$ provided by the radiance map provider 121, the compressed luminance value obtained by the initial luminance compression portion 127, information M(p) about the location of a cluster obtained by the region divider 128, and the mean brightness m of the clusters to obtain R, G, and B color values of a final tone-mapped image.

The adaptive tone mapping portion 129 uses a color saturation parameters automatically set for color correction of the mean brightness vector of K clusters. More specifically, the adaptive tone mapping portion 129 uses the color saturation parameter s determined by the default compressed luminance value to calculate R, G, and B values $c_o(p)$ of a final tone-mapped image. The color saturation parameter s is defined by Equation (9) below:

$$s_k = \frac{a}{m_k} \qquad (9)$$

where the subscript k, a, and $m_k$ denote a k-th cluster, a proportionality constant, and the mean brightness of k-th cluster, respectively. As expressed by Equation (9), the color saturation parameter s is inversely proportional to the mean brightness $m_k$ of the k-th cluster. That is, for a bright region having a large mean brightness, a small color saturation parameter s is used to produce color values of a tone-mapped image. As the color saturation parameter s decreases, the saturation of color in a tone-mapped image decreases. This may minimize color artifacts, one of the most challenging problems, in highlight smooth region and near a boundary region. The operation of the adaptive tone mapping portion 129 is indicated by Equation (5) above.

Figure 5A:
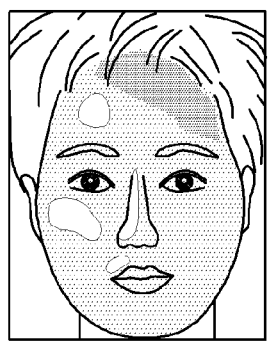
FIGS. 5A and 5B illustrate images acquired using conventional tone mapping and tone mapping according to another embodiment, respectively.
Figure 5B:
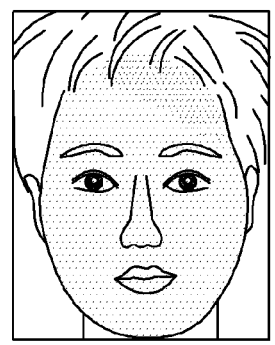

FIGS. 5A and 5B illustrate images acquired using conventional tone mapping and tone mapping according to another embodiment, respectively. Referring to FIG. 5A, color artifacts appear in a boundary region and a highlight region of the image. However, the image shown in FIG. 5B has a visually improved color in which color artifacts are reduced.

Figure 6:
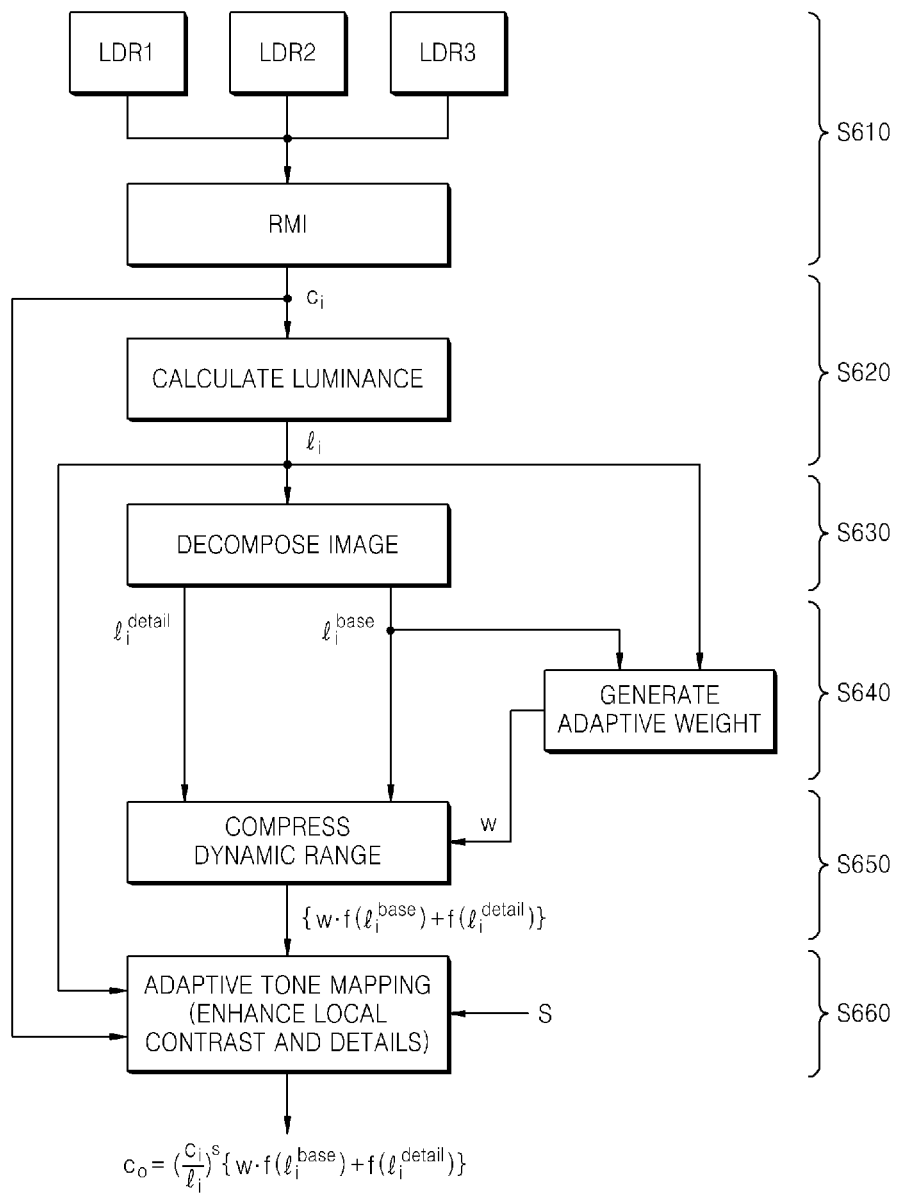
FIG. 6 is a flowchart of an image processing method, according to an embodiment.

FIG. 6 is a flowchart of an image processing method, according to an embodiment.

Referring to FIG. 6, a plurality of LDR images LDR1, LDR2, and LDR3 with different exposure levels are used to derive R, G, and B values $c_i$ of a radiance map RM1 (S610). Since the operation S610 is substantially the same as the above-described operation of the radiance map provider 121, a detailed description thereof is omitted. Then, a luminance value $l_i$ is obtained from the R, G, and B values $c_i$ of the radiance map RM1 (S620). The luminance value $l_i$ is then decomposed into a base layer $l_i^{base}$ and a detail layer $l_i^{det\ ail}$ using bilateral filtering (S630).

The ratio between the luminance value $l_i$ and the base layer $l_i^{base}$ is used to generate an adaptive weight w (S640). The adaptive weight w containing a local contrast control parameter is applied to enhance the local contrast in a final image.

Thereafter, a compressed luminance $\{w \cdot f(l_i^{base}) + f(l_i^{det\ ail})\}$ with enhanced local contrast and details are generated using the base layer $l_i^{base}$, the detail layer $l_i^{det\ ail}$, and the adaptive weight w (S650). By compressing the luminance value of the detail layer $l_i^{det\ ail}$, a final image with enhanced details can be obtained.

The R, G, and B values $c_i$ of the radiance map RM1, the luminance value $l_i$, and the compressed luminance value $\{w \cdot f(l_i^{base}) + f(l_i^{det\ ail})\}$ are used to obtain R, G, and B values $c_o$ of a final tone-mapped image (S660). The operation of the adaptive tone mapping is as expressed by Equation (2). The image with local contrast and details enhanced by the tone mapping operation is displayed on the display unit (150 in FIG. 1).

FIG. 7 is a flowchart of an image processing method, according to another embodiment.

Referring to FIG. 7, a plurality of LDR images LDR1, LDR2, and LDR3 with different exposure levels are used to derive R, G, and B values $c_i(p)$ of a radiance map RM1 (S710). Since the operation S710 is substantially the same as the above-described operation of the radiance map provider 121, a detailed description thereof is omitted. Then, a luminance value $l_i(p)$ is obtained from the R, G, and B values $c_i(p)$ of the radiance map RM1 (S720). The luminance value $l_i$ is compressed using a logarithmic function to produce an initial compressed luminance value $l_o(p)$ after preserving edges through bilateral filtering (S730).

Thereafter, a K-means algorithm is performed to segment an image into K clusters according to the initial compressed luminance value $l_o(p)$ (S740). Information M(p) about the location of a cluster obtained by segmenting the image and the mean brightness m may be obtained from the K-means algorithm.

The input color value $c_i(p)$ provided by the radiance map provider 121, the default compressed luminance value, the information M(p) about the location of a cluster, and the mean brightness m of the clusters are used to obtain R, G, and B color values of a final tone-mapped image (S750).

In this case, a color saturation parameter s determined by the initial compressed luminance value $l_o(p)$ is used to obtain the R, G, and B color values of the final tone-mapped image. The color saturation parameter s is inversely proportional to the mean brightness of a cluster. The tone mapping operation reduces color artifacts that may occur in highlight smooth regions and boundary regions. The image with reduced color artifacts is displayed on the display unit (150 in FIG. 1).

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, connecting lines between components, or connectors shown in the attached drawings are intended to represent exemplary functional relationships and/or physical or logical couplings between the various elements. It should be noted that many alternative or additional functional relationships, physical connections or logical connections may be present in a practical device. Furthermore, no element is essential to the practice of the invention unless the element is specifically described as "essential" or "critical".

As used in this specification, and in particular, the appended claims, the definite article "the" and like terms shall be applicable both to singular and plural forms. When a range is expressed herein, it should be understood that the invention includes all inventions to which discrete values within such a range are applied (unless otherwise specified) and application of the range in the inventions is considered the same as specifying the discrete values within the range in the detailed description of the invention. The steps of processes described herein may be performed in any order possible if it is not explicitly described that the steps should be performed in a particular sequential order, or unless otherwise specified. Furthermore, any sequence or order of steps described are given as examples of possible steps or sequence of steps and not as limitations. All examples herein and the terms "e.g.", "such as" and like terms do not limit the scope of the invention. It is to be understood that the use of the foregoing terms is exemplary and explanatory only and is not restrictive of the invention.

While the present general inventive concept has been particularly shown and described with reference to exemplary embodiments thereof, it will be understood by those of ordinary skill in the art that various changes, combinations, and modifications in form and details may be made therein according to design conditions and factors without departing from the spirit and scope of the general inventive concept as defined by the following claims including equivalents thereof.

What is claimed is:

1. An image processing method comprising:
   providing a radiance map;
   decomposing a luminance value of the radiance map into a base layer and a detail layer;
   generating a weight using a ratio between the luminance value of the radiance map and the base layer;
   creating a compressed luminance using the base layer, the detail layer, and the weight; and
   generating a tone-mapped image using a color value of the radiance map, the luminance value of the radiance map, and the compressed luminance value.

2. The method of claim 1, wherein the radiance map is derived from a plurality of low dynamic range images with different exposure levels.

3. The method of claim 2, wherein in the providing of the radiance map, the radiance map is a color value, the method further comprising transforming the color value into the luminance value after the providing of the radiance map.

4. The method of claim 1, wherein in the generating of the weight, a color saturation parameter that controls the saturation in obtaining the tone-mapped image is generated using the base layer.

5. An image processing apparatus comprising:
   a radiance map provider that provides a radiance map;
   a decomposer that decomposes a luminance value of the radiance map into a base layer and a detail layer;
   a weight generator that generates a weight using a ratio between the luminance value of the radiance map and the base layer;
   a compression portion that creates a compressed luminance using the base layer, the detail layer, and the weight; and
   a tone mapping portion that generates a tone-mapped image using a color value of the radiance map, the luminance value of the radiance map, and the compressed luminance value.

6. The apparatus of claim 5, wherein the radiance map provider derives the radiance map from a plurality of low dynamic range images with different exposure levels.

7. The apparatus of claim 6, wherein the radiance map provided by the radiance map provider is a color value, the apparatus further comprising a transformation unit that transforms the color value into the luminance value.

8. The apparatus of claim 5, wherein the weight generator generates a color saturation parameter that controls the saturation for the tone-mapped image using the base layer.

9. An image processing method comprising:
   providing a radiance map;
   compressing a luminance value of the radiance map;
   segmenting an image into a plurality of regions according to the compressed luminance value; and
   generating a tone-mapped image using a color value of the radiance map, the compressed luminance value, and information about the regions.

10. The method of claim 9, wherein the radiance map is derived from a plurality of low dynamic range images with different exposure levels.

11. The method of claim 10, wherein in the providing of the radiance map, the radiance map is a color value, the method further comprising transforming the color value of the radiance map into the luminance value after the providing of the radiance map.

12. The method of claim 9, wherein the compressing of a luminance value of the radiance map comprises:
   filtering the luminance value of the radiance map; and
   compressing the resulting luminance value using a logarithmic function.

13. The method of claim 9, wherein in the segmenting of an image into a plurality of regions, the image is segmented using a K-means algorithm.

14. The method of claim 13, wherein after the segmenting of the image, information about the locations of the regions and mean brightness information are generated.

15. The method of claim 14, wherein in the generating of a tone-mapped image, a color saturation parameter that controls the saturation for the tone-mapped image is generated using the mean brightness information.

16. An image processing apparatus comprising:
   a radiance map provider that provides a radiance map;
   a compression portion that compresses a luminance value of the radiance map;
   a region divider that segments an image into a plurality of regions according to the compressed luminance value; and
   a tone mapping portion that generates a tone-mapped image using a color value of the radiance map, the compressed luminance value, and information about the regions.

17. The apparatus of claim 16, wherein the radiance map provider derives the radiance map from a plurality of low dynamic range images with different exposure levels.

18. The apparatus of claim 16, wherein the radiance map provided by the radiance map provider is a color value, the apparatus further comprising a transformation unit that transforms the color value of the radiance map into the luminance value.

19. The apparatus of claim 16, wherein the compression portion filters the luminance value of the radiance map and compresses the resulting luminance value using a logarithmic function.

20. The apparatus of claim 16, wherein the region divider segments the image into the plurality of regions using a K-means algorithm.

21. The apparatus of claim 20, wherein information about the locations of the regions and mean brightness information are generated after the segmenting of the image.

22. The apparatus of claim 21, wherein the tone mapping portion generates a color saturation parameter that controls the saturation in obtaining the tone-mapped image using the mean brightness information.

* * * * *

UNITED STATES PATENT AND TRADEMARK OFFICE
CERTIFICATE OF CORRECTION

PATENT NO. : 8,750,608 B2
APPLICATION NO. : 13/267245
DATED : June 10, 2014
INVENTOR(S) : Jang et al.

It is certified that error appears in the above-identified patent and that said Letters Patent is hereby corrected as shown below:

On the Title Page

Item 12   Should read

Jang, et al.

Item 75   Should read

Soon-geun Jang, Seongnam-si (KR)

Rae-Hong Park, Seoul (KR)

Ji Won Lee, Seoul (KR)

Signed and Sealed this
Second Day of February, 2016

Michelle K. Lee
*Director of the United States Patent and Trademark Office*